Patented Dec. 29, 1936

2,066,191

UNITED STATES PATENT OFFICE 2,066,191

PREPARATION OF OLEFINIC THIOETHERS

Luther B. Turner, Elizabeth, N. J., assignor to Standard Oil Development Company, a corporation of Delaware No Drawing. Application May 3, 1933, Serial No. 669,197

10 Claims. (Cl. 260—151)

This invention relates to the preparation of olefinic thioethers from ketone mercaptols.

It has been found that ketone mercaptols may be converted to olefinic thioethers by the action of heat or of other means adapted to the splitting out of a mercaptan from the ketone mercaptol.

The ketone mercaptol may be conveniently obtained by reaction of a ketone with a mercaptan; for example, ethyl mercaptan and acetone react in the presence of anhydrous zinc chloride or hydrogen chloride to form acetone diethyl mercaptol. This reaction may be illustrated as $$2C_2H_5SH + (CH_3)_2CO = (C_2H_5)_2C(CH_3)_2 + H_2O$$

Similarly, mercaptols may be prepared with other ketones and/or mercaptans. As indicated the ketone used should contain a hydrocarbon group from which a hydrogen may be readily split off when the mercaptol made from that ketone is subjected to heat, the hydrogen atom liberated combining with the mercaptan group which is also simultaneously liberated on decomposition of the mercaptol, the final result being the formation of an olefinic linkage in the alkyl group of the ketone part of the mercaptol. In other words the invention may be expressed by the two following equations:

$$2RSH + R'COR' \longrightarrow (RS)_2C(R')_2$$
$$(RS)_2C(R')_2 \xrightarrow{\text{heat}} RSH + RSCR'(R'')$$

in which R is any alkyl or aryl group, R' is an alkyl group and R'' an alkyl group which has lost one atom of hydrogen. Mercaptans suitable for this invention may be obtained by steam distillation of a spent aqueous solution of caustic soda used for desulphurization of sour petroleum naphthas containing constituents boiling below about 212° F. Mercaptides of less than about six carbon atoms are selectively dissolved by the aqueous solution and are recovered as the corresponding mercaptans on steam distillation thereof. The mixture of these mercaptans so obtained may be used directly for reaction with ketones or the distillate may be divided into separate fractions, corresponding to one or more mercaptans, which may also be used for the same purpose.

The following example is presented in illustration of this invention.

Acetone diethyl mercaptol (dithioethyldimethylmethane) is heated in a distillation vessel to a temperature of about 100 to 120° C. The mercaptol decomposes rapidly with formation and vaporization of lighter products which are separately withdrawn and condensed. The resulting distillate on redistillation yields a liquid product boiling at 110 to 115° C. This product is isopropenyl ethyl thioether. It may be purified by extraction with aqueous caustic and by steam distillation. The purified thioether is a clear, light liquid having a rather disagreeable odor. The decomposition reaction may be represented by the equation:

$$(C_2H_5S)_2C(CH_3)_2 = C_2H_5SH + C_2H_5SC(CH_3) = CH_2$$

The lighter fractions of the product of the above destructive distillation contain ethyl mercaptan which may be reacted with additional acetone and recycled to the destructive distillation step.

The above mercaptol begins to decompose at about 80° C. at atmospheric pressure. The decomposition may also be conducted at pressures above or below atmospheric. A suitable decomposition temperature may be readily ascertained by heating any particular mercaptol selected for use. This invention is applicable to aryl and alkyl mercaptols, corresponding to the aryl and alkyl mercaptans, respectively.

The olefinic thioethers so obtained, for example, isopropenyl ethyl thioether, contain both an atom of sulfur and an olefinic double bond in the molecule, and hence are valuable starting materials for the synthesis of a variety of products. They may be polymerized by a progressive condensation to form high molecular weight polymerization products varying from oils to resinous products depending upon the molecular weight obtained. Such products are useful as lubricants or as addition and thickening agents in ordinary lubricating oils. Properties of these polymerization products may be modified by reactions involving the sulphur groups, for example, by oxidation, halogenation and formation of sulphonium derivatives.

This invention is not to be limited to any examples which are presented solely for purpose of illustration, but only by the following claims in which it is desired to claim all novelty insofar as the prior art permits.

I claim:

1. The method of producing an olefinic thioether which comprises heating a ketone mercaptol of the formula $(RS)_2C(R')_2$ in which R is either an alkyl or an aryl group and R' is an alkyl group, to a temperature at which a mercaptan is split off.

2. Process according to claim 1, in which the product containing the olefinic thioether is purified by extraction with aqueous caustic and by steam distillation.

3. Process according to claim 1, in which the ketone mercaptol used is acetone diethyl mercaptol.

4. Process for preparing isopropenyl ethyl thioether comprising heating acetone diethyl mercaptol to a decomposing temperature of about 80 to 120° C., withdrawing the resulting vaporized products of decomposition and separating from said products the said thioether.

5. The process of producing an olefinic thioether which comprises reacting mercaptans with an aliphatic ketone to produce a ketone mercaptol and heating the latter to a temperature at which a mercaptan is split off.

6. Process according to claim 5, in which the liberated mercaptan is recycled to the first stage of the process.

7. Process according to claim 5, in which the mercaptans used are alkyl mercaptans.

8. Process according to claim 5, in which the ketone used is acetone.

9. Process according to claim 5, in which the mercaptan used is ethyl mercaptan and the ketone used is acetone.

10. Process for preparing isopropenyl ethyl thioether which comprises reacting ethyl mercaptan with acetone to produce acetone diethyl mercaptol and heating the latter to a temperature of about 80 to 120° C., withdrawing the resulting vaporized products of decomposition and separating isopropenyl thioethyl ether from said products.

LUTHER B. TURNER.